United States Patent Office 3,318,907
Patented May 9, 1967

3,318,907
PROCESS AND INTERMEDIATES FOR MANU-
FACTURE OF 19-NORSTEROIDS
Raphael Pappo, Skokie, Ill., assignor to G. D. Searle &
Co., Chicago, Ill., a corporation of Delaware
No Drawing. Filed Oct. 11, 1965, Ser. No. 494,930
Claims priority, application Germany, Sept. 28, 1965,
S 99,711
6 Claims. (Cl. 260—326.5)

This aplication is a continuation-in-part of my copending Ser. No. 401,223, filed Oct. 2, 1964, and now abandoned.

The present invention relates to a novel process for the manufacture of 19-norsteroids and to novel intermediates utilized in that process.

A starting material suitable for utilization in the instant process is 6-amino-1-tetralone, which is described by Allinger and Jones, J. Org. Chem., 27, 70 (1962). In the initial step of the instant process, that starting material is contacted with a vinyl organometallic reagent, preferably in a suitable organic solvent medium such as diethyl ether, dibutyl ether, tetrahydrofuran, etc., to afford 6-amino-1-vinyl-1-tetralol. Alternatively, 6-amino-1-tetralone or 6-amino-1-vinyl-1-tetralol is converted to an intermediate wherein the amino group has been alkylated or acylated. The particular intermediates envisaged are illlstrated by the 1-vinyl-1-tetralols of the following structural formula

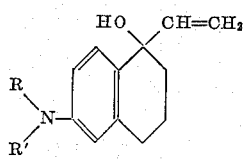

wherein R and R' are selected from the group consisting of hydrogen, hydrocarbon, (hydroxy-substituted)hydrocarbon, (amino-substituted)hydrocarbon, acyl and hydrocarbon-sulfonyl radicals and R and R' together can comprise the residue of a cycloaliphatic amine.

The hydrocarbon radicals indicated in the foregoing structural representation may be lower alkyl radicals such as methyl, ethyl, propyl, butyl, pentyl, hexyl, heptyl and the branched-chain groups isomeric therewith, aryl radicals such as phenyl, tolyl, and xylyl or aralkyl radicals such as benzyl and phenethyl. Representative of the acyl radicals depicted therein are lower alkanoyl groups such as acetyl, propionyl, butyryl, valeryl, caproyl, heptanoyl and the branched-chain radicals isomeric therewith and aroyl groups such as benzoyl, toluoyl, and xyloyl. The hydrocarbon-sulfonyl radicals are exemplified by p-toluenesulfonyl, benzenesulfonyl and methanesulfonyl. Examples of the cycloaliphatic amines whose residues R and R' can represent are pyrrolidine, piperidine, morpholine, pipecoline, piperazine and hexamethylenimine.

Specific examples of the substituted-amino derivatives included within the foregoing structural representation are 6-pyrrolidino-1-vinyl-1-tetralol, obtained by the reaction of vinyl magnesium chloride with 6-pyrrolidino-1-tetralone, the latter substance being produced by the reaction of 6-amino-1-tetralone with 1,4-dibromobutane in the presence of potassium carbonate, and 6-acetamido-1-vinyl-1-tetralol, obtained by the reaction of 6-amino-1-vinyl-1-tetralol with acetic anhydride in pyridine.

In the second step of the instant process, the above described 1-vinyl-1-tetralols are alkylated with a 2-alkyl-cyclopentane-1,3-dione in the presence of a suitable alkaline catalyst such as potassium hydroxide, sodium hydroxide or triethylamine to afford, depending upon the length of reaction, a tricyclic dione of the structural formula

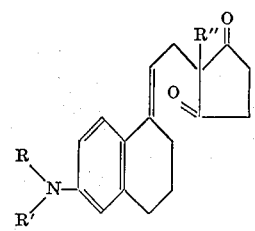

or a tetracyclic 14-hydroxy-17-one of the structural formula

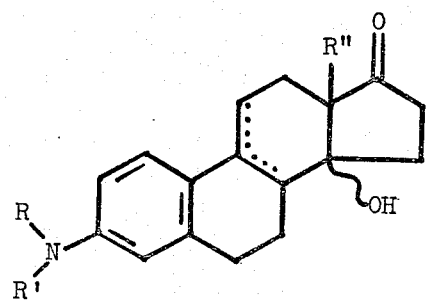

wherein R and R' are as hereinbefore defined, R'' is a lower alkyl radical as hereinbefore exemplified, the dotted lines are indicative of a double bond linking carbon 9 to an adjacent C-ring carbon atom and the wavy line denotes the alternative α or β configuration at carbon 14. As a specific example, 6-pyrrolidino-1-vinyl-1-tetralol is contacted with 2-methylcyclopentane-1,3-dione in toluene in the presence of triethylamine to afford 2-methyl-2-(6-pyrrolidino-1-naphthyliden)-ethylcyclopentane-1,3 - dione. When the reaction time is extended, however, further reaction occurs to yield the above illustrated 14-hydroxy intermediates. In that manner, 6-dimethylamino-1-vinyl-1-tetralol is converted to a mixture of 14-hydroxy-3-dimethylaminoestra-1,3,5(10),9(11)-tetraen-17-one and 14-hydroxy-3-dimethylaminoestra - 1,3,5(10),8(9) - tetraen-17-one.

The above described tricyclic and 14-hydroxy tetracyclic intermediates, upon reaction with a suitable reducing reagent such as lithium aluminum hydride or lithium tri-(tertiary-butoxy) aluminum hydride afford the corresponding hydroxy substances. 2-methyl-2-(6-dimethyl-amino-1-naphthyliden)ethylcyclopentane-1,3-dione, for example, is thus contacted with lithium tri(tertiary-butoxy) aluminum hydride in pyridine to yield 1-hydroxy-2-methyl-2-(6-dimethylamino-1-naphthyliden)-ethylcyclo-pentan-3-one. Ketalization of those intermediates, on the other hand, is effected by reaction with the appropriate monohydric or dihydric alcohol, preferably in the presence of a suitable acid catalyst. Thus, 2-methyl-2-(6-dimethylamino - 1 - naphthyliden)ethylcyclopentane-1,3-dione is converted to the corresponding 1-ethylene ketal by reaction with ethylene glycol in the presence of a catalytic quantity of p-toluenesulfonic acid.

When the aforementioned tricyclic or 14-hydroxy tetracyclic intermediates are dehydrated, the corresponding tetracyclic pentaenes of the following structural formula

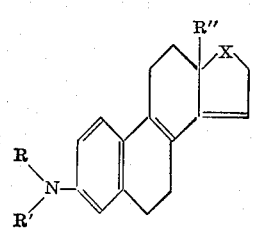

are produced. In that structural representation, the terms R, R' and R" are as hereinbefore defined, and X can be a carbonyl, hydroxymethylene or ketalized carbonyl group. In the instances where X represents a carbonyl group, these intermediates may be reduced by the method described hereinbefore to afford the corresponding 17-hydroxy compounds or may be contacted with a mono- or dihydric alcohol by the procedure described hereinbefore to afford the corresponding 17-ketals. This dehydration process is preferably conducted in an organic solvent medium in the presence of a strong acid catalyst. Thus, 2-methyl-2-(6-pyrrolidino-1-naphthyliden) - ethyl-cyclopentane-1,3-dione is heated in benzene with p-toluenesulfonic acid to yield 3-pyrrolidinoestra-1,3,5-(10),8(9),14-pentaen-17-one.

The aforementioned 1,3,5(10),8(9),14-pentaenes can be selectively hydrogenated to afford the corresponding 1,3,5(10),8(9)-tetraenes of the following structural formula

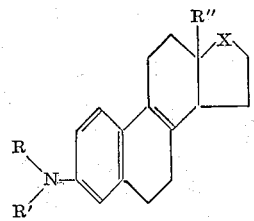

wherein R, R', R" and X are as hereinbefore defined. The aforementioned 3-pyrrolidinoestra-1,3,5(10),8(9), 14-pentaen-17-one, for example, in a solution of benzene and pyridine, is shaken in a hydrogen atmosphere in the presence of 5% palladium-on-calcium carbonate catalyst, thus producing 3-pyrrolidinoestra-1,3,5(10),8(9)-tetraen-17-one. The tetraen-17-ones encompassed by the latter structural formula are similarly converted to the corresponding 17-hydroxy and 17-ketal derivatives by methods analogous to those described hereinbefore. The tetraenes of the latter structural formula are useful also as anti-fungal and anti-protozoal agents in view of their ability to inhibit the growth of such organisms as *Trichophyton mentagrophytes* and *Tetrahymena gelleii*. In addition, they are inhibitors of dicotyledonous seed germination.

Reduction of the 8(9) double bond of the latter intermediates is conveniently effected by means of an alkali metal-liquid ammonia combination, optionally in the presence of aniline. Particularly suitable alkali metals are sodium, potassium and lithium. By that process, there are produced the 1,3,5(10)-trienes of the following structural formula

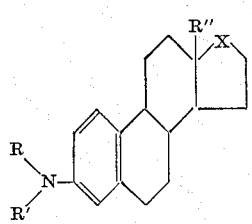

wherein R, R', R" and X are as hereinbefore defined. As a specific example, 3-pyrrolidinoestra-1,3,5(10),8(9)-tetraen-17β-ol in tetrahydrofuran containing aniline is allowed to react with sodium and liquid ammonia to produce 3-pyrrolidinoestra-1,3,5(10)-trien-17β-ol.

Reduction of either the instant 1,3,5(10),8(9)-tetraenes or the 1,3,5(10)-trienes with an alkali metal and liquid ammonia results in the 2,5(10)-dienes of the following structural formula

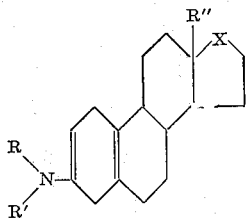

wherein R, R', R" and X are as hereinbefore defined. Thus, either 3-dimethylaminoestra-1,3,5(10)-trien-17β-ol or 3-dimethylaminoestra-1,3,5(10),8(9)-tetraen-17β - ol, when contacted with lithium metal and liquid ammonia in tetrahydrofuran containing tertiary-butyl alcohol, affords 3-dimethylaminoestra-2,5(10)-dien-17β-ol.

Careful acid hydrolysis of the latter 2,5(10)-diene intermediates affords the corresponding 3-keto-Δ$^{5(10)}$ compounds of the following structural formula

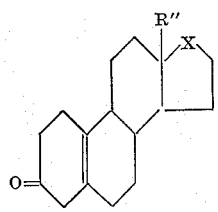

wherein R" and X are as hereinbefore defined. The latter substances are known intermediates to pharmacologically useful compounds. The hydrolysis of 3-dimethyl-aminoestra-2,5(10)-dien-17-one thus results in estr-5(10)-ene-3,17-dione, which is useful in the manufacture of 17α-ethynyl-17β-hydroxyestr-5(10)-en-3-one, a known progestational agent. More vigorous acid hydrolysis of the aforementioned 2,5(10)-diene intermediates affords the known 3-keto-Δ$^4$ compounds of following structural formula

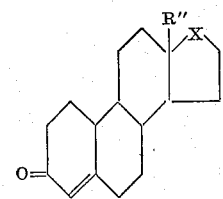

wherein R" and X are as hereinbefore defined. The latter substances are useful as intermediates in the manufacture of known pharmacologically useful steroids possessing the 3-keto-Δ$^4$ structure. The compounds of the latter structural formula wherein X is a ketalized carbonyl function are particularly useful intermediates in view of the stability of the ketal function to alkaline reagents. Thus, 3 - dimethylaminoestra - 2,5(10)-dien-17-one 17-diethyl ketal is contacted with aqueous sodium acetate in methanol to yield estr-4-ene-3,17-dione 17-diethyl ketal. Reduction of the 3-keto group is effected by reaction with lithium tri-(tertiary-butoxy) aluminum hydride in tetrahydrofuran, thus affording 3β-hydroxy-estr-4-en-17-one 17-diethyl ketal, and the 17-ketal function is removed by reaction with aqueous acetic acid to yield 3β-hydroxyestr-4-en-17-one. Ethynylation of the latter substance followed by acetylation of the resulting 17α-ethynylestr-4-ene-3β,17β-diol affords the known pharmacologically useful 17α-ethynylestr-4-ene-3β,17β-diol 3,17-diacetate.

The products of the instant process described hereinbefore are obtained as *dl*-mixtures. The individual *d* and *l* enantiomorphs are obtained, however, by resolution techniques involving salt formation between the 3-amino moiety and an optically active acid. Suitable acids for this purpose are exemplified by *d*-camphorsulfonic, *d*-α-bromocamphorsulfonic, *l*-malic, *l*-mandelic, *l*-menthoxyacetic, *d* and *l*-tartaric, *d* and *l*-diacetyltartaric and *d* and *l*-dibenzoyltartaric acid. Thus, *dl*-3-dimethylaminoestra-1,3,5(10),8(9),14-pentaen-17β-ol is contacted with d-dibenzoyltartaric acid to afford the amine salt, which is decomposed with aqueous sodium hydroxide in methanol to yield levorotatory 3-dimethylaminoestra-1,3,5 (10),8(9),14-pentaen-17β-ol. An alternative procedure for obtaining the instant optically active compounds involves the use of an optically active reagent to effect an assymetric synthesis. As a specific example, 2-methyl-2-(6-dimethylamino - 1 - naphthyliden)ethylcyclopentane 1,3-dione is heated in benzene with d-camphorsulfonic acid to afford levorotatory 3-dimethylaminoestra-1,3,5-(10),8(9),14-pentaen-17-one.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.). Quantities of materials are expressed in parts by weight unless otherwise noted.

Example 1

A mixture containing 2.5 parts of 6-amino-1-tetralone, 9 parts of 1,4-dibromobutane, 16 parts of potassium carbonate, 30 parts of dioxane and 9 parts of water is heated with stirring at the reflux temperature, in a nitrogen atmosphere, for about 7 days. At the end of that time the dioxane layer is decanted, and the aqueous layer is extracted with benzene. The organic extract is combined with the dioxane layer, and the resulting solution is concentrated to a small volume by distillation under reduced pressure. The residual material is dissolved in benzene, and the benzene solution is extracted three times with 100-part by volume portions of 3 N hydrochloric acid. These acidic extracts are discarded, and the organic layer is then extracted successively with seven 100-part by volume portions of 3 N hydrochloric acid. The latter extracts are combined and made alkaline to approximately pH 10 by the addition of ammonium hydroxide. The resulting precipitated product is extracted into benzene, and the benzene extracts are concentrated to dryness under reduced pressure to afford the crude product. Purification by recrystallization from ether yields crystalline 6-pyrrolidino-1-tetralone, melting at about 107–108.5°.

To 77 parts by volume of a 1.4 M tetrahydrofuran solution of vinyl magnesium chloride in 22.6 parts of toluene is added, at —20° to —30° over a period of about 90 minutes, a solution of 5.2 parts of 6-pyrrolidino-1-tetralone in 15.7 parts of toluene. The reaction mixture is kept between —20° and —10° for about one hour, then is allowed to warm to about 15° over a period of about one hour. After cooling of the mixture to —20°, 14.4 parts of isopropyl alcohol followed by a saturated aqueous solution containing 45 parts of ethylene diamine tetraacetic acid tetrasodium salt are added, and the organic layer is separated by decantation, then diluted with toluene and washed with water. The washed solution is dried over anhydrous sodium sulfate, following which 3.7 parts of triethylamine is added, and the mixture is evaporated to dryness under reduced pressure at room temperature to afford 6-pyrrolidino - 1 - vinyl-1-tetralol, characterized by the following structural formula

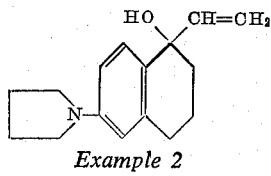

Example 2

The substitution of an equivalent quantity of 2,2-bis-chloroethyl ether in the procedure of Example 1 results in 6-morpholino-1-tetralone.

By substituting an equivalent quantity of 6-morpholino-1-tetralone and otherwise proceeding according to the processes of Example 1, there is obtained 6-morpholino-1-vinyl-1-tetralol.

Example 3

A solution of 10 parts of 6-amino-1-tetralone in 30 parts of water is diluted with 160 parts of acetone, and 54 parts of powdered potassium carbonate followed by 50.2 parts of methyl iodide are added successively. The resulting reaction mixture is stirred at room temperature of about 3 days, then is filtered, and the filtrate is concentrated to a small volume under reduced pressure. Extraction of the residual mixture with benzene affords an organic solution, which is washed successively with aqueous sodium hydroxide and water, then dried over anhydrous sodium sulfate and evaporated to dryness under reduced pressure. Recrystallization of the resulting crude product from ether affords prismatic crystals of 6-dimethylamino-1-tetralone, melting at about 82–83.5° and characterized further by an ultraviolet absorption maximum at about 340 millimicrons with a molecular extinction coefficient of about 28,000.

To a solution of 5 parts by volume of 3.2 M vinyl magnesium bromide in tetrahydrofuran, diluted with 6.3 parts of tetrahydrofuran, is added, at —60°, one part of 6-dimethylamino-1-tetralone. The resulting reaction mixture is stirred for about one hour, during which time the temperature is allowed to rise to approximately 20°. At the end of that period, the reaction mixture is stored at about 5° for approximately 3 hours, then is cooled to about —70° and successively diluted with approximately one part of isopropyl alcohol and excess saturated aqueous ethylene diamine tetraacetic acid tetrasodium salt. This aqueous mixture is allowed to warm to approximately 10°, then is extracted with benzene. The benzene layer is separated, washed with water, dried over anhydrous sodium sulfate and concentrated to dryness under reduced pressure to afford 6-dimethylamino-1-vinyl-1-tetralol, characterized by an ultraviolet absorption maximum at about 261 millimicrons with a molecular extinction coefficient of about 10,000. This compound is represented by the following structural formula

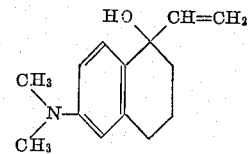

Example 4

When 6-amino-1-tatralone is allowed to react with an equivalent quantity of ethyl iodide by the procedure described in Example 3, there is obtained 6-diethylamino-1-tetralone.

The substitution of an equivalent quantity of 6-diethyl-amino-1-tetralone in the procedure of Example 3 results in 6-diethylamino-1-vinyl-1-tetralol.

Example 5

To 7 parts by volume of 3 M vinyl magnesium chloride in tetrahydrofuran is added 6.3 parts of tetrahydrofuran, and the resulting mixture is stirred with cooling to about —70°. To that solution is then added dropwise, at —70°, a solution of one part of 6-amino-1-tetralone in 8 parts of tetrahydrofuran. After the addition is complete, the reaction mixture is stirred for about 3 hours, during which time the temperature is allowed to rise to room temperature. After cooling the mixture again to about —70°, 2 parts of isopropyl alcohol followed by 20 parts by volume of a saturated aqueous solution of the sodium salt of ethylene diamine tetraacetic acid are added. The resulting mixture is extracted with benzene, and the benzene extract is washed successively with a saturated aqueous solution of the sodium salt of ethylene diamine tetraacetic acid, water and saturated aqueous sodium chloride.

During those washes, the mixture is kept alkaline by the addition of a small quantity of triethylamine. The benzene solution is then dried over anhydrous sodium sulfate and stripped of solvent under reduced pressure to afford 6-amino-1-vinyl-1-tetralol. This compound is characterized by an ultraviolet absorption maximum, in methanol, at about 240 millimicrons with a molecular extinction coefficient of about 7,475 and also by infrared absorption peaks, in chloroform, at about 2.76, 2.93, 6.16, 6.26 and 6.62 microns. Its nuclear magnetic resonance spectrum, in deuterochloroform, displays a quartet between 348 and 375 cycles per second and an octet between 300 and 325 cycles per second.

Example 6

To a solution of 25 parts of 6-amino-1-vinyl-1-tetralol in 50 parts of pyridine, under nitrogen, is added dropwise with stirring 25 parts of acetic anhydride, during which time the temperature is maintained between —10° and —2°. After completion of the addition, the reaction mixture is stirred for 2 hours between —5° and 0°, then is diluted carefully with approximately 60 parts of methanol. The resulting mixture is allowed to stand at about 0° for approximately 30 minutes, then is diluted with toluene and washed successively with cold dilute aqueous sodium hydroxide and water. Drying over anhydrous sodium sulfate followed by evaporation of the solvent under reduced pressure affords a residual oil which crystallizes upon standing. That material is purified by two successive recrystallizations from acetone, thus producing 6-acetamido-1-vinyl-1-tetralol, melting at about 150–154°. This compound exhibits an ultraviolet absorption maximum, in methanol, at about 247.5 millimicrons with a molecular extinction coefficient of about 16,240. It is represented by the following structural formula

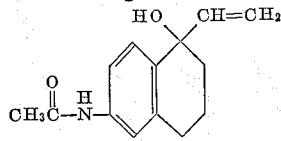

Example 7

When an equivalent quantity of propionic anhydride is substituted in the procedure described in Example 6, there is obtained 6-propionamido-1-vinyl-1-tetralol.

Example 8

To a solution of 5 parts of 6-amino-1-tetralone hydrochloride in 100 parts of pyridine is added 7 parts of p-toluenesulfonyl chloride, causing an exothermic reaction to occur. The reaction mixture is then allowed to stand at room temperature for about 72 hours, following which time it is diluted with 2 parts of water and kept at room temperature for about 3 hours. Concentration to a small volume under reduced pressure affords a residual mixture, which is diluted with water, and the resulting crystalline precipitate is collected by filtration, washed on the filter with water and dried to afford 6-p-toluenesulfonylamido-1-tetralone, melting at about 216–222°.

When an equivalent quantity of 6-p-toluenesulfonylamido-1-tetralone is allowed to react with vinyl magnesium chloride by the procedure described in Example 1, there is obtained 6-p-toluenesulfonylamido-1-vinyl-1-tetralol of the following structural formula

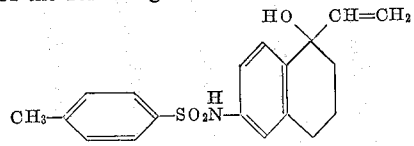

Example 9

The substitution of an equivalent quantity of methanesulfnoyl chloride in the procedure described in Example 8 results in 6-methanesulfonylamido-1-tetralone.

When an equivalent quantity of 6-methanesulfonylamido-1-tetralone is substituted in the procedure described in Example 1, there is obtained 6-methanesulfonylamido-1-vinyl-1-tetralol.

Example 10

A mixture of 1.8 parts of 6-amino-1-tetralone, 1.4 parts of methyl iodide and 20 parts of tetrahydrofuran is allowed to stand at room temperature for about 7 days, then is concentrated to dryness under reduced pressure. Aqueous sodium hydroxide is added, and the resulting alkaline mixture is extracted with benzene. The organic layer is dried over anhydrous sodium sulfate, stripped of solvent and fractionally distilled to afford 6-methylamino-1-tetralone.

When an equivalent quantity of 6-methylamino-1-tetralone is substituted in the procedure described in Example 1, there is obtained 6-methylamino-1-vinyl-1-tetralol.

Example 11

The reaction of 6-amino-1-tetralone with an equivalent quantity of ethyl iodide by the procedure described in Example 10 results in 6-ethylamino-1-tetralone.

By the substitution of an equivalent quantity of 6-ethylamino-1-tetralone in the procedure described in Example 9, there is produced 6-ethylamino-1-vinyl-1-tetralol.

What is claimed is:
1. A compound of the formula

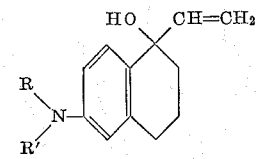

wherein R is selected from the group consisting of hydrogen, lower alkyl, lower alkanoyl and a hydrocarbonsulfonyl radical wherein the hydrocarbon radical is monocyclic aryl or lower alkyl, R' is a member of the class consisting of hydrogen and lower alkyl and R and R' together comprise the residue of a secondary heterocycloaliphatic amine selected from the group consisting of pyrrolidine, piperidine, morpholine, pipecoline, piperazine and hexamethylenimine.

2. 6-pyrrolidino-1-vinyl-1-tetralol.
3. 6-dimethylamino-1-vinyl-1-tetralol.
4. 6-amino-1-vinyl-1-tetralol.
5. 6-p-toluenesulfonylamido-1-vinyl-1-tetralol.
6. 6-acetamido-1-vinyl-1-tetralol.

References Cited by the Examiner

Wagner et al.: Synthetic Organic Chemistry (1953), p. 162.

ALEX MAZEL, Primary Examiner.

JOSEPH A. NARCAVAGE, Assistant Examiner.